(12) United States Patent
Atnip et al.

(10) Patent No.: US 8,736,936 B2
(45) Date of Patent: May 27, 2014

(54) MANUFACTURING OPTICAL MEMS WITH THIN-FILM ANTI-REFLECTIVE LAYERS

(75) Inventors: Earl V. Atnip, Plano, TX (US); William R. Morrison, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 200 days.

(21) Appl. No.: 13/437,670

(22) Filed: Apr. 2, 2012

(65) Prior Publication Data

US 2012/0307342 A1 Dec. 6, 2012

Related U.S. Application Data

(63) Continuation of application No. 12/055,419, filed on Mar. 26, 2008, now abandoned.

(51) Int. Cl.
*G02B 26/08* (2006.01)
(52) U.S. Cl.
USPC ........................................... 359/223.1
(58) Field of Classification Search
CPC ........... G02B 26/0833; G02B 26/0825; G02B 26/0841
USPC ...................... 359/223.1, 290, 291
See application file for complete search history.

(56) References Cited

U.S. PATENT DOCUMENTS

| | | | |
|---|---|---|---|
| 6,053,617 A | 4/2000 | Kaeriyama | |
| 6,282,010 B1 | 8/2001 | Sulzbach et al. | |
| 6,605,543 B1 | 8/2003 | Zheng | |
| 6,891,655 B2 * | 5/2005 | Grebinski et al. | 359/291 |
| 7,365,898 B2 | 4/2008 | Gong et al. | |
| 7,402,880 B2 | 7/2008 | Neidrich | |
| 7,601,486 B2 | 10/2009 | Neidrich | |
| 2004/0130775 A1 | 7/2004 | Grebinski et al. | |
| 2005/0157376 A1 | 7/2005 | Huibers et al. | |
| 2008/0230863 A1 | 9/2008 | Gautier et al. | |

* cited by examiner

*Primary Examiner* — Euncha Cherry
(74) *Attorney, Agent, or Firm* — Warren L. Franz; Wade J. Brady, III; Frederick J. Telecky, Jr.

(57) ABSTRACT

In accordance with the teachings of one embodiment of this disclosure, a method for manufacturing a semiconductor device includes forming a support structure outwardly from a substrate. The support structure has a first thickness and a first outer sidewall surface that is not parallel with the substrate. The first outer sidewall surface has a first minimum refractive index. A first anti-reflective layer is formed outwardly from the support structure and outwardly from the substrate. A second anti-reflective layer is formed outwardly from the first anti-reflective layer. The first and second anti-reflective layers each includes respective compounds of at least two elements selected from the group consisting of: silicon; nitrogen; and oxygen.

20 Claims, 2 Drawing Sheets

MANUFACTURING OPTICAL MEMS WITH THIN-FILM ANTI-REFLECTIVE LAYERS

This application is a continuation of application Ser. No. 12/055,419, filed Mar. 26, 2008, the entirety of which is hereby incorporated by reference.

BACKGROUND

This disclosure relates in general to semiconductor devices, and more particularly to manufacturing optical microelectromechanical systems (MEMS) with thin-film anti-reflective layers.

Semiconductor devices may be designed to interact with electromagnetic radiation that is incident upon a particular area of the device. One such semiconductor device is a spatial light modulator (SLM), which serves to redirect the path of incoming radiation by action of one or more accepted principles of optics, such as reflection, refraction, or diffraction. Unfortunately, in many of these devices, some incident radiation may not be redirected in the desired manner due to physical gaps, unwanted diffraction, scattering effects, or other phenomena. Such radiation may be deemed "stray radiation," which may degrade the performance of the overall system if a mechanism of absorbing the radiation is not present. Conventional methods of reducing stray radiation are limited for a variety of reasons.

BRIEF DESCRIPTION OF THE DRAWINGS

Example embodiments are described with reference to accompanying drawings, wherein.

DETAILED DESCRIPTION OF EXAMPLE EMBODIMENTS

The teachings of some embodiments of this disclosure provide a semiconductor device having thin anti-reflective layer(s) operable to absorb radiation that may otherwise reflect off surfaces disposed inwardly from the anti-reflective layer(s). Such anti-reflective layers may be utilized in any of a variety of semiconductor devices, such as a spatial light modulator, a variable diffraction grating, a liquid crystal light valve, or other semiconductor device, to reduce the effects of "stray radiation" on the performance of the device. An example of one such device is a deformable micromirror device, a subset of which includes digital micromirror devices; however, the teachings of this disclosure may apply to any of a variety of semiconductor devices. A portion of a digital micromirror device is illustrated in FIG. 1.

Figure 1:
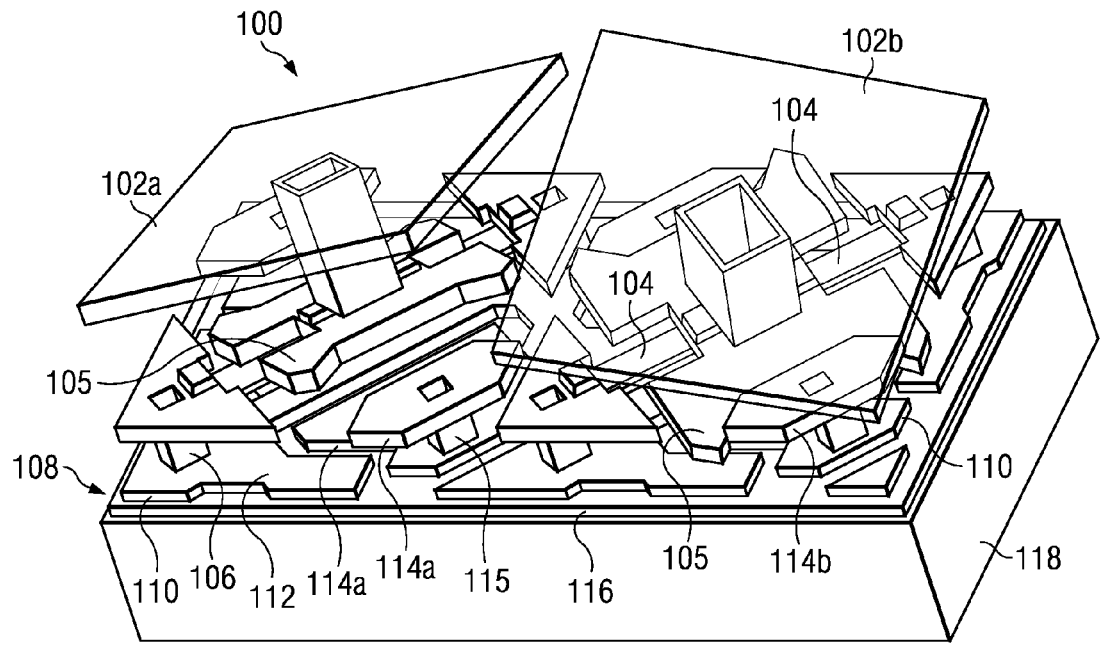
FIG. 1 is a perspective view of a portion of a deformable micromirror device (DMD) in accordance with one embodiment of this disclosure.

FIG. 1 illustrates a perspective view of a portion of a deformable micromirror device (DMD) 100. In the illustrated embodiment, DMD 100 includes an array of hundreds of thousands of micromirrors 102 encased within a cavity at least partially defined by a substrate 118 and a transparent window (not explicitly shown). Each micromirror 102 may tilt up to plus or minus twelve degrees, for example, creating an active "on" state condition or an active "off" state condition. Each micromirror may selectively communicate at least a portion of an optical signal or light beam 102 by transitioning between its active "on" and "off" states. To permit micromirrors 102 to tilt, each micromirror 102 is attached to a respective hinge 104 mounted on a hinge post 106, and spaced by means of an air gap over support structures 108. In some embodiments, support structures 108 may each be considered a MEMS base that supports outwardly disposed MEMS superstructure (e.g., hinge posts 106, which in turn support hinge 104 and micromirror 102). In some embodiments, thin anti-reflective layers of silicon nitride ($Si_3N_4$), silicon dioxide ($SiO_2$), and/or silicon oxynitride ($Si_2N_2O$) may be formed outwardly from portions of the support structures 108, including sidewalls 110, as explained further below.

Micromirrors 102 tilt in the positive or negative direction as a result of preferential electrostatic forces between a micromirror 102 and at least one of its corresponding electrodes 114. In this example, a yoke 105 increases the electrostatic forces acting on micromirror 102 and stops micromirror 102 rotation by contacting conductive conduits 112. Although this example includes yoke 105, other examples may eliminate yoke 105. In those examples, micromirrors 102 may tilt in the positive or negative direction until micromirrors 102 contact a suitable mirror stop (not explicitly shown).

In this particular example, support structures 108 form an arrangement having electrically-isolated conductive conduits 112 portions and electrode 114 portions. In addition, support structures 108 are multi-layered etched-metallic structures encased within an anti-reflective layer(s) and disposed outwardly from a dielectric layer 116, as explained further below. Dielectric layer 116 operates to isolate support structures 108 from a substrate 118.

In this particular example, substrate 118 comprises the control circuitry associated with DMD 100. The control circuitry may include any hardware, software, firmware, or combination thereof capable of at least partially contributing to the creation of the electrostatic forces between electrodes 114 and micromirrors 102. The control circuitry associated with substrate 118 functions to selectively transition micromirrors 102 between "on" state and "off" state based at least in part on data received from a processor (not explicitly shown).

Substrate 118 and support structures 108 typically comprise one or more layers of metals and dielectrics that may be optically reflective. During operation of some embodiments, portions of substrate 118 and support structures 108, including sidewalls 110, may be exposed to incident radiation, referred to herein as "stray radiation," due to the tilting of micromirrors 102 and the gaps between micromirrors 102. In conventional DMDs, this stray radiation can result in unwanted reflections that may reduce the image quality produced by the DMD.

Accordingly, the teachings of some embodiments of the disclosure recognize methods of disposing thin film anti-reflective layer(s) along the reflective surfaces of support structure 108, including, for example, sidewalls 110. In addition, the layer(s) may form a protective "blanket" outwardly from dielectric layer 116 between support structures 108, thereby mitigating or eliminating stray radiation from optically reflective surfaces within substrate 118.

In some embodiments, the anti-reflective layer(s) may be more chemically stable than layers used in conventional designs. For example, layers formed from alternative materials, such as, for example, titanium nitride (TiN), may delaminate over time after exposure to various compounds enclosed within the cavity of a MEMS device. In contrast, the anti-reflective layers of some embodiments of this disclosure may be less chemically reactive than TiN when exposed to the same compounds enclosed within a MEMS device. Anti-reflective layers that are less-reactive or even non-reactive with the various compounds enclosed within the cavity of a MEMS device, or chemically stable anti-reflective layers, may enhance structural stability, optical performance, and reliability. According to the teachings of some embodiments, examples of such chemically stable anti-reflective layers include thin films composed of any suitable combination of silicon, nitrogen, and/or oxygen (e.g., silicon nitride ($Si_3N_4$), silicon dioxide ($SiO_2$), and/or silicon oxynitride ($Si_2N_2O$)).

DMD 100 may be used as a basis for forming any of a variety of semiconductor devices, including optical MEMS devices. Some examples of such semiconductor devices include a spatial light modulator, a gain equalizer, an optical filter, or any combination of these or other optical devices. Methods for manufacturing a semiconductor device in accordance with the teachings of various embodiments of this disclosure are illustrated in FIGS. 2A through 2C.

Figure 2A:
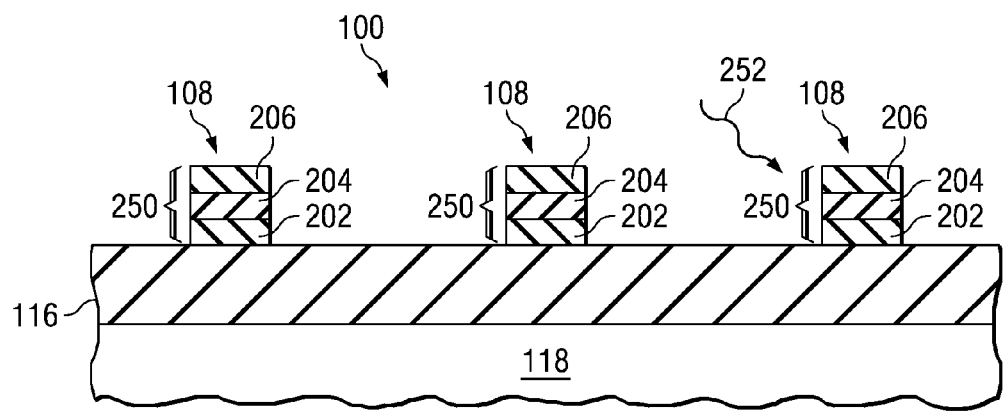
FIG. 2A shows a cross-sectional view of a portion of the DMD of FIG. 1 after the formation of a dielectric layer outwardly from a substrate, and after the formation of support structures disposed outwardly from the dielectric layer.
Figure 2B:
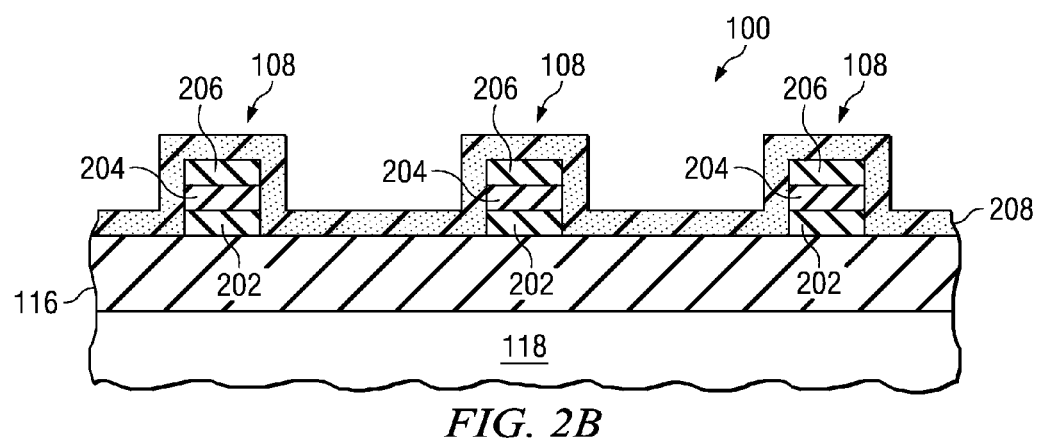
FIG. 2B shows a cross-sectional view of a portion of the DMD of FIG. 2A after the formation of a first anti-reflective layer outwardly from the support structures and the dielectric layer.
Figure 2C:
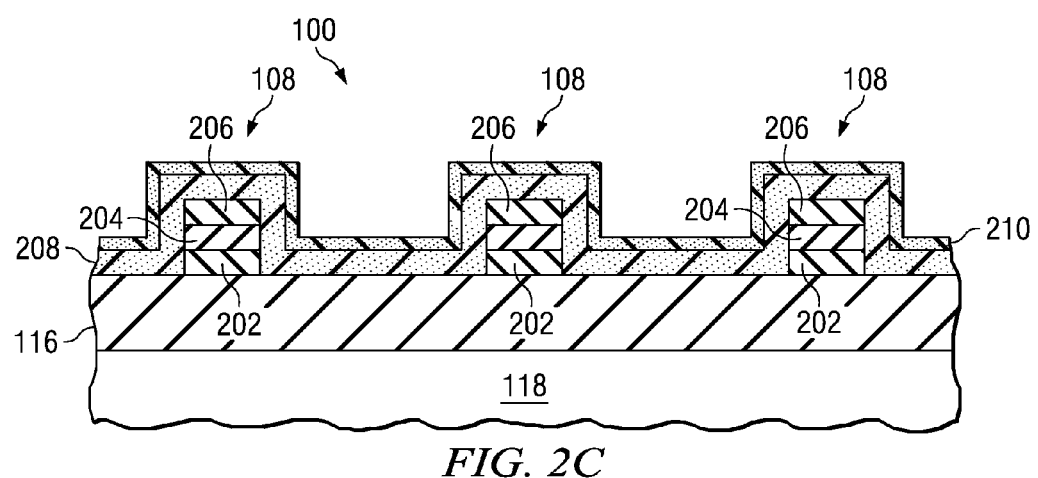
FIG. 2C shows a cross-sectional view of a portion of the DMD of FIG. 2B after the formation of a second anti-reflective layer outwardly from the first anti-reflective layer.

FIGS. 2A through 2C illustrate one example of a method of forming a portion of the DMD 100 of FIG. 1 that disposes thin film, chemically stable, anti-reflective layers 208 and 210 capable of mitigating or even eliminating stray reflections from inwardly disposed support structure sidewalls and metal lines. More specifically, FIG. 2A shows a cross-sectional view of a portion of DMD 100 after the formation of dielectric layer 116 outwardly from substrate 118, and after the formation of support structures 108 disposed outwardly from dielectric layer 116.

Substrate 118 may comprise any suitable material used in semiconductor chip fabrication, such as silicon, poly-silicon, indium phosphide, germanium, or gallium arsenide. In various embodiments, substrate 118 can include complementary metal-oxide semiconductor (CMOS) circuitry capable of controlling DMD 100 after its formation. In one non-limiting example, the CMOS circuitry may comprise a CMOS memory circuit, such as, for example, a 5T or 6T SRAM cell.

Dielectric layer 116 acts to electrically isolate support structures 108 from substrate 118. Dielectric layer 116 may be formed from any dielectric material suitable for use in semiconductor manufacturing, such as TEOS oxide, HDP oxide, or any suitable combination of dielectrics. In addition, dielectric layer 116 may have any suitable thickness, such as approximately 10,000 angstroms, and may be formed in any suitable manner. Such suitable deposition techniques include, but are not limited to, sputtering, chemical vapor deposition, plasma-enhanced chemical vapor deposition, and spin-coating. In some cases, dielectric layer 116 can be planarized, such as by using a chemical mechanical polish (CMP) technique, to provide a relatively flat surface.

Support structures 108 are each generally operable to provide a stable base and conductive conduits for respectively coupled electromechanical components, such as, for example, hinge posts 106 and electrode posts 115 of FIG. 1. Support structures 108 may have any suitable arrangement and include any suitable number of layers (e.g., layers 202, 204, and 206). In addition, support structures 108 may be composed of any suitable material. For example, each layer 202, 204, and 206 may be respectively formed from aluminum or an aluminum alloy, copper, silver, gold, tungsten, titanium, titanium nitride (TiN), silicon, polysilicon, carbon, chromium, and nickel and/or a combination of these or other suitable materials. Support structure 108 may have any suitable thickness, such as approximately 5,000 angstroms, and may be formed in any suitable manner, such as deposition. Such suitable deposition techniques include, but are not limited to, sputtering, chemical vapor deposition, plasma-enhanced chemical vapor deposition, and spin-coating.

In this particular embodiment, plural layers 202, 204, and 206 were previously deposited and collectively patterned and etched in the approximate arrangement of support structures 108 of FIG. 1. As shown in FIG. 2A, support structures 108 include sidewalls 250 that are substantially perpendicular to the surface of dielectric layer 116. In various embodiments, sidewalls 250 may be highly reflective and positioned within the pathway of potential stray radiation, as illustrated by beam 252. As shown in FIG. 2B, an anti-reflective layer 208 may make the use of more reflective materials possible for layer(s) 202, 204, and 206 by covering exposed support structure 108 surfaces, including sidewalls 250, with a light absorptive material.

FIG. 2B shows a cross-sectional view of a portion of the DMD 100 of FIG. 2A after the formation of a first anti-reflective layer 208 outwardly from support structures 108 and dielectric layer 116. Although anti-reflective layer 208, support structures 108, and dielectric layer 116 are shown as being formed without interstitial layers between them, such interstitial could alternatively be formed without departing from the scope of this disclosure.

In various embodiments, anti-reflective layer 208 may be an insulator. An anti-reflective layer 208 that sufficiently resists the flow of electric current will not electrically connect support structures 108 and thus will not short electrodes 114 to conductive conduits 112. Some examples of anti-reflective layers 208 with insulator or nonconductive properties include thin films composed of any suitable combination of silicon, nitrogen, and/or oxygen (e.g., silicon nitride ($Si_3N_4$), silicon dioxide ($SiO_2$), and/or silicon oxynitride ($Si_2N_2O$)). In this example, anti-reflective layer 208 is formed by sputter depositing a silicon nitride layer to a thickness that is less than the total thickness of support structures 108; however, any suitable material, processing, or thickness may be used.

In some embodiments, all or a portion of anti-reflective layer 208 may be exposed to chemical components encased within a cavity of a MEMS device (e.g., DMD 100) or otherwise proximately available in the atmosphere. Some chemical reactions can create residue that may inhibit, for example, the mechanical and optical performance of DMD 100. In addition, some reactions can cause all or a portion of thin film layers to delaminate, which might cause catastrophic failure of some MEMS devices. Accordingly, some embodiments provide an anti-reflective layer 208 that is not reactive, or less reactive, to such proximately positioned chemical components. In some embodiments, anti-reflective layers 208 with such non-reactive properties include thin films composed of any suitable combination of silicon, nitrogen, and/or oxygen (e.g., silicon nitride ($Si_3N_4$), silicon dioxide ($SiO_2$), and/or silicon oxynitride ($Si_2N_2O$)). In addition, some embodiments of this disclosure provide a second anti-reflective layer, or a "capping" layer, as described further with reference to FIG. 2C, which may shield all or a portion of the first anti-reflective layer 208 from exposure to an outwardly disposed atmosphere or layer.

FIG. 2C shows a cross-sectional view of a portion of DMD 100 of FIG. 2B after the formation of a second anti-reflective layer 210 outwardly from the first anti-reflective layer 208. Although anti-reflective layers 208 and 210 are shown as being formed without interstitial layers between them, such interstitial could alternatively be formed without departing from the scope of this disclosure. Various embodiments may not include second anti-reflective layer 210. In this example, however, anti-reflective layer 210 is formed by depositing silicon dioxide to any suitable thickness; however, any suitable processes or materials may be used.

In some embodiments, completely covering the first anti-reflective layer 208 by a second anti-reflective layer 210 of silicon dioxide may further enhance optical performance by mitigating stray reflections. In addition, in some embodiments, such a second anti-reflective layer 210 may further mitigate or even eliminate undesired chemical reactions by shielding all or a portion of the first anti-reflective layer 208 and all underlying layers from chemical components enclosed within a cavity of a fully fabricated DMD 100.

Thus, FIGS. 2A through 2C provide enhanced and cost-effective methods for manufacturing a portion of DMD 100 or any other suitable optical MEMS device in accordance with the teachings of various embodiments of this disclosure. Subsequent semiconductor processing techniques well known in the art may than be utilized to complete DMD 100 by forming the superstructure of DMD 100 including, without limitation, hinge posts 106, remaining electrodes 112, hinges 104, and micromirrors 102. Such processing techniques may or may not also include selectively removing portions of anti-reflective layer 208 and/or capping layer 210.

This disclosure describes various systems and methods that mitigate the detrimental optical effects of stray radiation using thin anti-reflective layer(s). In some embodiments, the relative thinness of the anti-reflective layer(s) 208 and 210 may enable minimal process or design changes for subsequent levels of DMD processing. For example, various embodiments may be implemented with minimal adjustments of the distance between micromirrors 102 and substrate 118 compared to conventional designs and processes. In various embodiments, such anti-reflective layer(s) 208 and 210 may also provide protection against corrosion and electrical shorts.

Although this disclosure has been described with several embodiments, a myriad of changes, variations, alterations, transformations, and modifications may be suggested to one skilled in the art, and it is intended that this disclosure encompass such changes, variations, alterations, transformations, and modifications as fall within the scope of the appended claims.

What is claimed is:

1. A method of manufacturing a spatial light modulator device having an array of micromirrors, each micromirror being attached to a respective hinge mounted on a support post and spaced by a gap over a support structure; the method comprising:
   forming a dielectric layer over a substrate;
   forming support posts to a first thickness at spaced positions over the dielectric layer, the support posts including sidewalls;
   depositing an anti-reflective layer of silicon nitride to a second thickness less than the first thickness over the support posts including over the sidewalls and over portions of the dielectric layer between the support posts; and
   depositing an anti-reflective capping layer of silicon oxide over the anti-reflective layer of silicon nitride.

2. The method of claim 1, wherein the sidewalls are substantially perpendicular to a surface of the dielectric layer.

3. The method of claim 2, wherein the support posts comprise material selected from the group consisting of aluminum or an aluminum alloy, copper, silver, gold, tungsten, titanium, titanium nitride (TiN), silicon, polysilicon, carbon, chromium, and nickel.

4. The method of claim 3, wherein the second thickness is less than 1 micron.

5. The method of claim 4, wherein the support posts comprise a plurality of layers.

6. The method of claim 5, further comprising:
   forming a plurality of hinges coupled to respective ones of the support posts;
   forming a plurality of micromirrors operable to pivot respective ones of the plurality of micromirrors about at least one axis; and
   forming a transparent window disposed outwardly from the plurality of micromirrors, the transparent window and the substrate at least partially defining an enclosed cavity.

7. The method of claim 6, further comprising disposing one or more chemical compounds within the enclosed cavity, the one or more chemical compounds being more chemically reactive with titanium nitride than with the anti-reflective layers.

8. The method of claim 1, wherein the second thickness is less than 1 micron.

9. The method of claim 1, further comprising:
   forming a plurality of hinges coupled to respective ones of the support posts;
   forming a plurality of micromirrors operable to pivot respective ones of the plurality of micromirrors about at least one axis; and
   forming a transparent window disposed outwardly from the plurality of micromirrors, the transparent window and the substrate at least partially defining an enclosed cavity.

10. The method of claim 9, further comprising disposing one or more chemical compounds within the enclosed cavity, the one or more chemical compounds being more chemically reactive with titanium nitride than with the anti-reflective layers.

11. A spatial light modulator device having an array of micromirrors, each micromirror being attached to a respective hinge mounted on a support post and spaced by a gap over a support structure; the device comprising:
   a dielectric layer formed over a substrate;
   support posts formed to a first thickness at spaced positions over the dielectric layer, the support posts including sidewalls;
   an anti-reflective layer of silicon nitride deposited to a second thickness less than the first thickness over the support posts including over the sidewalls and over portions of the dielectric layer between the support posts; and
   an anti-reflective layer of silicon oxide deposited over the first anti-reflective layer.

12. The device of claim 11, further comprising:
   a plurality of micromirrors;
   a plurality of hinges, the hinges coupled to respective ones of the support posts and operable to pivot respective ones of the plurality of micromirrors about at least one axis; and
   a transparent window disposed outwardly from the plurality of micromirrors, the transparent window and the substrate at least partially defining an enclosed cavity.

13. The device of claim 12, comprising one or more chemical compounds disposed within the enclosed cavity, the one or more chemical compounds being more chemically reactive with titanium nitride (TiN) than with the anti-reflective layers.

14. The device of claim 13, wherein the anti-reflective layer of silicon nitride is less than 1 micron thick.

15. The device of claim 14, wherein the sidewalls are substantially perpendicular to a surface of the dielectric layer.

16. The device of claim 15, wherein the support posts comprise material selected from the group consisting of aluminum or an aluminum alloy, copper, silver, gold, tungsten, titanium, titanium nitride (TiN), silicon, polysilicon, carbon, chromium, and nickel.

17. The method of claim 16, wherein the support posts comprise a plurality of layers.

18. The device of claim 11, wherein the anti-reflective layer of silicon nitride is less than 1 micron thick.

19. The device of claim 11, wherein the sidewalls are substantially perpendicular to a surface of the dielectric layer.

20. The device of claim 11, wherein the support posts comprise material selected from the group consisting of aluminum or an aluminum alloy, copper, silver, gold, tungsten, titanium, titanium nitride (TiN), silicon, polysilicon, carbon, chromium, and nickel.

* * * * *